Feb. 21, 1961 F. L. GEARY 2,972,226
VARIABLE AREA CONVERGING-DIVERGING NOZZLE
Filed Oct. 6, 1955
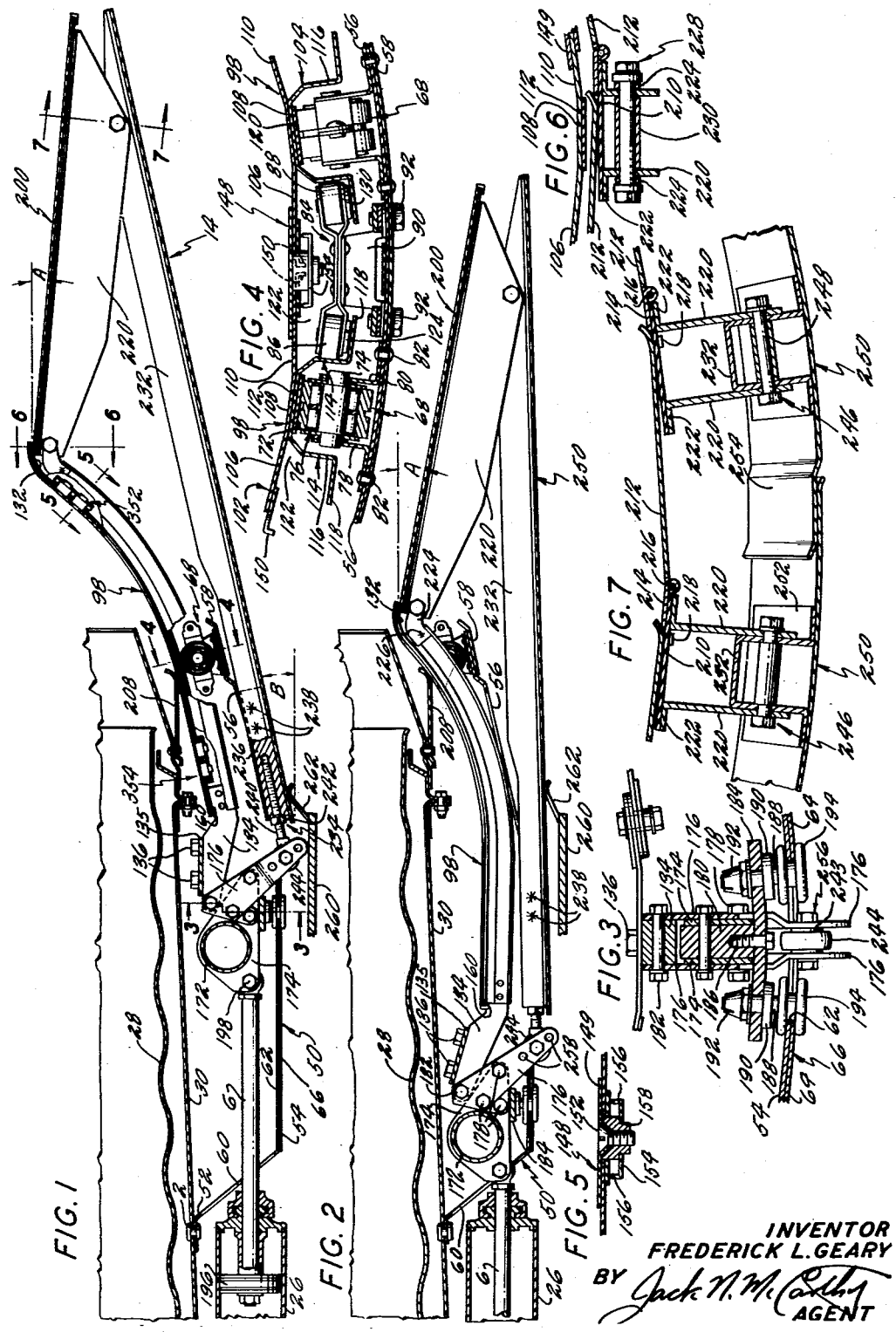
INVENTOR
FREDERICK L. GEARY
BY Jack N. McCarthy
AGENT

2,972,226
VARIABLE AREA CONVERGING-DIVERGING NOZZLE

Frederick L. Geary, Springfield, Mass., assignor to United Aircraft Corporation, East Hartford, Conn., a corporation of Delaware Filed Oct. 6, 1955, Ser. No. 538,873

15 Claims. (Cl. 60—35.6)

This invention relates to a converging-diverging propelling nozzle for a turbojet engine.

An object of this invention is to provide a converging-diverging nozzle for a turbojet engine which can be made continuously variable.

Another object of this invention is to provide a converging-diverging nozzle in which the converging portion is slidably mounted and the diverging portion is pivotally mounted.

A further object of this invention is to provide a converging-diverging nozzle for an exhaust duct in which the diverging portion changes its angularity with the center line of the duct as it moves between its "open" and "closed" position.

Another object of this invention is to provide a converging-diverging nozzle to which fairings may be attached which will fair smoothly with external structure.

A further object of this invention is to provide a converging-diverging nozzle in which undesirable actuating loads are minimized and closing loads are imposed thereon by the exhaust gases.

Another object of this invention is to provide a converging-diverging nozzle in which the converging and diverging portions change angularity at a desired rate and value at a minimum weight within a restricted space.

Other objects and advantages will become apparent from the following description.

In the accompanying drawings there is illustrated a suitable mechanical embodiment for the purpose of disclosing the invention. The drawings, however, are for the purpose of illustration only and are not to be taken as limiting or restricting the invention. It will be apparent to those skilled in the art that various changes in the illustrated construction may be made without exceeding the scope of the invention.

Fig. 1 is a sectional view taken through the lower portion of a nozzle embodying the invention showing the nozzle attached to a duct and in a "closed" position.

Fig. 2 is a sectional view taken through the lower portion of a nozzle embodying the invention showing the nozzle attached to a duct and in an "open" position.

Fig. 3 is a view taken along the line 3—3 of Fig. 1.
Fig. 4 is a view taken along the line 4—4 of Fig. 1.
Fig. 5 is a view taken along the line 5—5 of Fig. 1.
Fig. 6 is a view taken along the line 6—6 of Fig. 1.
Fig. 7 is a view taken along the line 7—7 of Fig. 1.

Fig. 1 shows a convergent-divergent nozzle 14 mounted on the outer shell, or shroud, 30 of an exhaust duct with an inner shell 28 mounted within said outer shell 30. The specific construction of the exhaust duct does not become a part of this invention. It is shown and claimed in the copending application of Walter Doll, Jr., Serial No. 483,204 filed January 21, 1955, now Patent No. 2,851,854, for an Afterburner Liner. While a showing of a turbojet engine has not been made, other copending applications show different types of nozzles connected to an entire turbojet engine. These applications are application Serial No. 316,911, filed October 25, 1952, now Patent No. 2,831,319 to Frederick L. Geary for a Variable Area Nozzle and application Serial No. 316,912, filed October 25, 1952, now Patent No. 2,932,161, to Frederick L. Geary and William Granville Taylor for a Variable Area Nozzle.

The nozzle 14 is connected at its forward end to the outer shell 30 of the exhaust duct by a plurality of rivets 2. The nozzle 14 comprises two main parts, one part including those elements which remain fixed in relation to the exhaust duct and the other part including those elements which move in relation to the exhaust duct to place the nozzle in an "open" or "closed" position.

The first or fixed part of the nozzle includes a ring member 50. The forward part 52 of the ring member 50 is formed as a flange and extends substantially radially from the outer shroud 30. The middle part 54 of the ring member 50 is shaped like a cylinder and extends rearwardly from the outer edge of the forward part 52. The rearward part 56 of ring member 50 is shaped substantially as a frustum of a cone with the larger end being fixed to the rearward end of the middle part 54 and the remainder tapering inwardly toward the rear. A reinforcing ring 58 is fixed around the outer edge adjacent the end of rearward part 56.

Slots 60 are spaced equally around the circumference of the forward part 52 of the ring member. Each alternate slot receives an actuating piston rod 6. The middle part 54 of this ring member 50 has elongated slots 62 extending in an axial direction from front to rear and spaced equally around the circumference. These slots 62 extend into the rearward part 56 to a point adjacent the ring 58. Bracket-forming plates 176, to be hereinafter described, extend through the elongated slots 62. Further, some or all of these slots 62 may have a reinforcing strip 64 fixed alongside each side of said slot along its middle part length to provide a track 66 for a purpose to be hereinafter described.

Wheel units 68 are spaced equally around the inner side of the rear end of part 56 of the ring member 50. There is one of these units for each flap 98 of the nozzle. Each wheel unit 68 comprises a wheel 72 mounted on a shaft 74 by a double roller bearing assembly 76. Each shaft is rotatably mounted between two flange members 78 and 80 which are fixedly mounted to the rear part of the ring member 50. This is shown in Fig. 4 as being done by rivets 82. The center line of the shaft 74 is normal to the axis of the exhaust duct and normal to a radius line extended from said axis.

Equally spaced between each of the first wheel units 68 there is mounted a second wheel unit 84. Each wheel unit 84 comprises two wheels, 86 and 88 respectively, mounted one on each side of a bracket 90 which is fixedly mounted to a rear part of a ring member 50 by bolts 92. Each wheel or roller, 86, 88, rotates on an axis which extends substantially parallel to a radius line drawn through the center line of the exhaust duct and the center of an adjacent wheel unit 68.

The second or movable part of the nozzle includes a plurality of sliding flaps 98 which provide the movable converging or restricting portion of the nozzle. These flaps are positioned circumferentially around the rear end of the exhaust duct for movement between their forward or "open" position as shown in Fig. 2 and their rearward or "closed" position as shown in Fig. 1. As viewed in Fig. 4, each sliding flap 98 comprises a plate member 102 having a second plate member 104 affixed to the outer side thereof providing tracks for both the first and second wheel units, 68 and 84, referred to above. Plate member 102 is curved along its length and is formed having end parts 106 and 110 angularly displaced inwardly from a center part 108. Plate member 104 is formed having a center part 112 extending the length thereof substantially the width of part 108 of plate member 102 which is fixedly mounted to its outer side.

Side parts 114 extend substantially radially in an outward direction one from each side of the center part 112. A portion 116 of these side parts 114 lies in a plane which is parallel to a plane drawn through the center line of the exhaust duct and the center of a wheel unit 68 located between said parts. These side parts 114 of each sliding flap 98 provide a guide for a wheel unit 68. A track plate 120 is fixed along the outer side of center part 112 of the plate member 104 to provide the surface which engages the wheel 72 of the wheel unit 68.

End parts 118 extend the length of the plate member 104 forming an angle of 90°, one each with the free end of a side part 114. These end parts 118 project in a direction away from the wheel unit 68 guided within the respective side parts. These end parts form with plate member 102 channels 122 into which the wheels 86 and 88 of adjacent wheel units 84 are positioned. Side parts 114 form the engaging surfaces or tracks for each of the wheels 86 and 88 of the wheel units 84 which were just referred to. Wear or guide pads 124 are mounted on each wheel unit 84 between the wheel unit and each of its cooperating end parts 118.

The rear end of each of the flaps 98 curves outwardly such as at 132. The forward end of each of the sliding flaps 98 has a boss member 134 affixed thereto which projects forwardly therefrom. Adjacent boss members 134 are connected to each other by use of a connector plate 135. One plate 135 is fixedly attached near its center to the inner side of each boss member 134 by two bolts 136. The connector plate 135 has an extension on either side thereof. The extensions of these connector plates which extend toward each other from adjacent boss members are connected by the use of a lost-motion device. The free end of one extension has located therein an oblong hole and the free end of the cooperating extension has a bolt extending therefrom which engages said oblong hole.

Between each pair of sliding flaps 98 a floating flap seal 148 is positioned to prevent leakage therebetween. Each seal is formed having a seal plate member 149 positioned over the gap formed between the end part 106 of one plate member 102 and the end part 110 of the adjacent plate member 102. Each seal plate member 149 is contoured to the shape of the sliding flaps 98 and is located on the inner side of the flaps. Each end part 106 and 110 of each flap 98 has an outwardly projecting flange 150 extending along the length of the edge of the part (see Fig. 4). As shown in Fig. 1, the flap seal 148 has a connection 352 at the rear of the flaps and a connection 354 at the forward end of the flaps. Each connection includes two bolts 152 which rigidly attach said seal plate member 149 to a small plate member 154 located on the other side of the sliding flaps 98. Each small plate member 154 has a flange 156 extending inwardly from each side in a direction parallel to the flanges 150. A spacer member 158 in the connection properly spaces the small plate member from the flap 98 to allow a floating action. The outwardly extending flanges 150 attached to the adjacent flaps 98 are of such a length so as to engage the inwardly extending flanges 156, of cooperating connections 352 and 354, if an attempt is made to move one past the other. These flanges are placed to permit the flaps 98 to slide to their "open" position before restricting movement of the flaps.

The contouring of the seal plate members 149 to the sliding flaps 98 holds them in position axially. However, to further prevent their sliding axially rearwardly, a hook 160 is affixed to the forward end of each seal plate member 149 and hooks around the forward edge of the sliding flaps 98. A flexible circumferential seal member 208 is connected adjacent the end of the outer shell or shroud 30 and is biased against the inner side of the flaps 98 and floating flap seals 148.

The actuating mechanism includes a hoop, or circular member, 172 which is located between the end of the afterburner and the ring member 50 and mounted for axial movement on tracks 66 in a manner to be hereinafter described. These tracks, as stated hereinbefore, are the reinforced slots 62 of the middle part 54 of the ring member. While all of the slots 62 may be reinforced to serve as tracks, it is only necessary that a portion of these be used. The number of tracks needed to efficiently operate a nozzle of this type depends on the size and weight of the nozzle. In this application we will consider that the hoop member 172 rides on four tracks. Further, a varying number of sliding flaps may be used but for the nozzle described we shall consider that there are twenty-four.

Hoop member 172 has mounted therearound a plurality of bifurcated brackets 174, one for each sliding flap 98. The forward end of each boss member 134 of a sliding flap 98 is pivotally attached to its cooperating bracket 174 by two bracket-forming plates 176. These plates are fixedly mounted on each bracket 174 on the outer side thereof by bolts 178. A spacer 180 is provided within the bracket 174 to prevent deformation of the bracket when the bracket-forming plates are bolted thereto. The forward end of the boss 134 is pivotally mounted to the bracket-forming plates by a bolt 182.

For each track 66 deemed necessary for use there is a cross member 184 fixed to the spacer 180 at its bottom such as by bolts 186, welding or any other suitable means. This cross member extends to each side of the bracket 174. A shaft 188 extends downwardly from each side of the cross member 184 into one side of a slot 62. Each shaft is fixed to the cross member by the use of an integral flange 190 and a nut 192 which is fixed to threaded end of each shaft. Rotatably mounted on the free end of each shaft is a double flanged roller 194 which is positioned so that on one side the flanges overlap one side of a track 66.

Every other bracket 174 is attached at its forward end to a piston 196 in a cylinder 26 by a piston rod 6. The free end of each piston rod 6 has a hole therein which is aligned with holes in its cooperating bracket 174 and held by a bolt 198. Each piston rod 6 passes through an aligned slot 60 as stated hereinbefore. While only twelve actuating cylinders and associated mechanisms have been described, it is to be understood that other numbers of cylinders may be used depending in part on the size of the nozzle and the size of the cylinders.

The piston rods 6 are moved by connecting one end or the other of cylinders 26 to an operating pressure. While the operation of the piston rods can be performed manually, it is preferred that an automatic control be used. An automatic control of a type which could be used is shown and claimed in the patent of Richard J. Coar, United States Patent No. 2,715,311, dated August 16, 1955, for a Control Device.

The second or movable part of the nozzle also includes a plurality of pivoted flaps 200 which provide the movable diverging portion of the nozzle. Each pivoted or diverging flap 200 comprises a plate member 210 having a second plate member 212 pivoted along the length of one side thereof. A strip 214 is fixed along one edge of the plate member 210 which provides the hinge portion which engages the hinge portion of the second plate member 212. This hinge may be constructed such as a piano hinge. A pin 216 extends through these hinge portions to provide the pivoted or hinged action. A hook 218 is provided at the rear end of each of the second plate members 212 which engages the adjacent plate member 210 of an adjacent flap 200 for holding it in position. A spring may be provided to bias the free ends of the second plate member 212 against its cooperating plate member. Two structural members 220 are attached to each flap 200, one on each side thereof, which extend substantially the length of the flap and project substantially radially in an outward direction. These members 220 are fixed to the outer side of their respective plate members 210 by the use of flanges 222. These flanges may be welded or fixed in any other suitable manner.

These pivoted or diverging flaps 200 are connected one each at its forward end to the rearward end of a sliding flap 98. Each sliding flap 98 has two rearwardly extending lugs 224 fixed thereto at their ends 226, one on each side of the second plate member 104, which engage the forward ends of the members 220 of its cooperating pivoted or diverging flap 200. Holes in the lugs 224 are placed over holes in the forward ends of members 220 and a bolt assembly 228 passes through these holes and permits a pivoted attachment (see Fig. 6). A spacer 230 is provided to maintain a substantially parallel relationship between each of the members 220 of a pivoted flap 200.

Each pivoted or diverging flap 200 is in turn connected at its rearward end to the free end of the bracket-forming plates 176 which are connected to the forward end of its cooperating sliding flap 98. These bracket-forming plates 176 project through the slot 62 of the middle part 54 of the ring member 50. This connection comprises a channel member 232 having means 234 on its forward end to adjust the length of the connection. This means includes an extension 236 which is attached to the forward end of the channel member 232 such as by welding at 238 and extends forwardly therefrom. Extension 236 is internally threaded and has received therein a bolt 240. A lock nut 242 holds the bolts 240 in place; this provides for adjusting the length of the connection. The free end of the bolt 240 carries a self-aligning bearing 243 which consists of a ball-shaped member mounted in a housing 244.

Each channel member 232 is pivoted to its cooperating pivoted or diverging flap 200 at its rearward end. The channel member 232 is placed between the ends of the members 220 and a bolt assembly 246 passes through aligned holes in the channel 232 and member 220 which permits a pivoted attachment (see Fig. 7). A spacer 248 is provided to maintain a substantially parallel relationship between each of the members 220 of a pivoted flap 200. Each self-aligning bearing 243 is pivoted to its cooperating bracket-forming plates 176 by a bolt assembly 256.

Fixed to the external surface of each channel member 232 is a fairing flap 250 which extends approximately the length of channel 232 and extension 236. These fairing flaps 250 are mounted by the use of flanges 252 on the channel members 232. The fairing flaps 250 may be welded to these flanges or fixed by any other suitable means. Each fairing flap 250 merely consists of a plate having the length referred to above and the proper curvature depending on the size of the nozzle and the number of flaps used. One side of each flap 250 is offset as at 254 to slidably receive the engaging side of its adjacent flap.

*Operation*

Assuming the device to be in the position shown in Fig. 1, fully "closed," when the pistons 196 are moved to the left, or front, this action in turn moves the hoop or ring 172 in the same direction by use of the piston rods 6. Since the hoop 172 is mounted for only straight axial movement, the point of the forward pivotal attachment of each of the sliding flaps 98 is moved in a forward direction along a straight line. This action slides the flaps 98 through their wheel units 68 and 84. As these flaps 98 slide toward their forward positions the area formed thereby is gradually increased until they reach their foremost positions, at which point the nozzle is in its fully "open" position. As these sliding flaps move toward their forward positions, the forward ends of flaps 200 forming the diverging section of the nozzle move therewith.

The point of the forward pivotal attachment of each of the fairing flaps 250, since they are connected to the hoop 172, also moves in a forward direction along a straight line. This action moves the fairing flaps 250 to their forward positions. As these fairing flaps move toward their forward positions, the rearward ends of flaps 200 forming the diverging section of the nozzle move therewith.

It can be seen that as the forward end of each flap 200 is moved by the rearward end of a flap 98 and the rearward end of each flap 200 is moved by the rearward end of a flap 250, the angle A which each of the flaps 200 makes with the center line of the duct 30 increases at a desired rate to a predetermined value as the nozzle is opened. While the flaps could be fixed in relation to one another in units, the size and weight of such a nozzle would be prohibitive and not provide the desired change in angle between nozzle flaps. For the arrangement shown in Figs. 1 and 2 it can be seen that this angle does increase from its value in Fig. 1 to its larger value in Fig. 2, which is from approximately 5° to 10°.

It is to be noted that the angle B formed by the fairing flaps 250 and a line drawn parallel to the center line of the duct 30 decreases, for the arrangement shown, as the nozzle moves from its position in Fig. 1 to its position in Fig. 2. Two means have been provided to vary these angles A and B. They are: (1) the adjustability of the length of the distance between the point at which channel member 232 is pivoted to flap 200 and the point at which the bearing 243 is attached to its respective bracket-forming plates 176 and (2) the movability of the point at which each bearing 243 is pivoted on its respective bracket-forming plates 176. The former action is made possible by the bolt 240 and lock nut 242 and the latter action is made possible by the inclusion of the holes 258 in the bracket-forming plates 176. A portion of the external housing of an aircraft is shown at 260. A seal member 262 extends between this member 260 and the fairing flaps 250.

If the nozzle is now to be moved to its position in Fig. 1, the pistons 196 are moved to the right, or rear, and through a sequence of operations, the reverse of that described above, the nozzle is moved to this "closed" position.

This nozzle is a continuously variable one and can also be used in any position between its fully "open" and fully "closed" positions.

I claim:

1. In combination, a jet exhaust, means for varying the area of said exhaust including sliding flaps forming a convergent section and flaps pivoted thereto forming a divergent section, said means being movable between a retracted and extended position, means for moving said area varying means, said area varying means forming in its retracted position a divergent extension of said jet exhaust and forming in its extended position a convergent-divergent extension of said jet exhaust.

2. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust.

3. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being connected to said moving means, the rearward end of each pivoted flap being connected to said moving means.

4. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being pivoted to said moving means, a link connecting the rearward end of each pivoted flap to said moving means, said link being pivoted to said pivoted flap and pivoted to said moving means.

5. In combination, a jet exhaust, means for varying the area of said exhaust including sliding flaps forming a convergent section and flaps pivoted thereto forming a divergent section, said means being movable between a retracted and extended position, means for moving said varying means, said area varying means forming in its retracted position a divergent extension of said jet exhaust and forming in its extended position a convergent-divergent extension of said jet exhaust, means for varying the angle of said divergent section as it moves between a retracted and extended position.

6. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being connected to said moving means, the rearward end of each pivoted flap being connected to said moving means, said moving means being mounted on tracks extending parallel to the axis of said jet exhaust.

7. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being pivoted to said moving means, a link connecting the rearward end of each pivoted flap to said moving means, said link being pivoted to said pivoted flap and pivoted to said moving means, said moving means being mounted on tracks extending parallel to the axis of said jet exhaust.

8. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being connected to said moving means, means connecting the rearward end of each pivoted flap to said moving means, said last named means including fairing flaps cooperating to encase said sliding and pivoted flaps.

9. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being pivoted to said moving means, a link connecting the rearward end of each pivoted flap to said moving means, said link being pivoted to said pivoted flap and pivoted to said moving means, a fairing flap being mounted on each link, said fairing flaps cooperating to encase said sliding and pivoted flaps.

10. In combination, a jet exhaust, means for varying the area of said exhaust including sliding flaps forming a convergent section and flaps pivoted thereto forming a divergent section, said means being movable between a retracted and extended position, means for moving said varying means, said pivoted flaps forming in the retracted position of said area varying means a divergent extension of said jet exhaust and said sliding flaps and pivoted flaps forming in the extended position of said area varying means a convergent-divergent extension of said jet exhaust, the forward end of each sliding flap being connected to said moving means, means connecting the rearward end of each pivoted flap to said moving means, said last named means including fairing flaps cooperating to encase said sliding and pivoted flaps, means for varying the angle of said divergent section at a desired value as it moves between a retracted and extended position.

11. In combination, a duct and a nozzle for controlling the effective area of the discharge end of the duct, said nozzle having a plurality of flaps mounted for slidable the effective area of the discharge end of the duct, said flaps being of such a length so as to vary the effective area of the discharge end of said duct as the flaps slide by forming a convergent section with reference to said duct, means forming a divergent section from said first named flaps including a second flap pivoted at its forward end to the rearward end of each of said plurality of flaps.

12. In combination, a duct and a nozzle for controlling the effective area of the discharge end of the duct, said nozzle having a plurality of flaps mounted for slidable movement adjacent the discharge end of the duct, said flaps being of such a length so as to vary the effective area of the discharge end of said duct as the flaps slide by forming a convergent section with reference to said duct, means forming a divergent section from said first named flaps including a second flap pivoted at its forward end to the rearward end of each of said plurality of flaps, said divergent section changing the angle it forms with the axis of said duct as said first named flaps slide from one position to another.

13. In combination, a duct and a nozzle for controlling the effective area of the discharge end of the duct, said nozzle having a plurality of flaps mounted for slidable movement adjacent the discharge end of the duct, said flaps being of such a length so as to vary the effective area of the discharge end of said duct as the flaps slide by forming a convergent section with reference to said duct, a ring encircling said duct and being attached to the forward end of each of said plurality of flaps, means forming a divergent section from said first named flaps including a second flap pivoted at its forward end to the rearward end of each of said plurality of flaps, each of said second flaps being connected at its rearward end to said ring.

14. In combination, a duct having an outlet, a mounting member positioned around said duct adjacent to the outlet, a plurality of flaps, a plurality of members projecting radially inwardly from said mounting member, each flap including track means, said projecting members having a roller on each side thereof, said track means of said flaps engaging said rollers, means for actuating said flaps, said flaps being of such a length so as to vary the effective area of said outlet by forming a convergent section therefrom, a second flap pivoted at its forward end to the rearward end of each of said plurality of flaps, said second flaps forming a divergent section from said first named flaps, means connecting said second flaps to said actuating means.

15. In combination, a duct having an outlet, a mounting member positioned around said duct adjacent to the outlet, a plurality of flaps, a plurality of members projecting radially inwardly from said mounting member, each flap including track means, said projecting members having a roller on each side thereof, said track means of said flaps engaging said rollers, means for actuating said flaps, said flaps being of such a length so as to vary the effective area of said outlet by forming a convergent section therefrom, a second flap pivoted at its forward end to the rearward end of each of said plurality of flaps, said second flaps forming a divergent section from said first named flaps, means for varying the angle of said divergent section as said actuating means actuates said flaps.

References Cited in the file of this patent

UNITED STATES PATENTS

| | | |
|---|---|---|
| 2,625,008 | Crook | Jan. 13, 1953 |
| 2,780,056 | Colley | Feb. 5, 1957 |

FOREIGN PATENTS

| | | |
|---|---|---|
| 1,018,650 | France | Oct. 15, 1952 |
| 726,591 | Great Britain | Mar. 23, 1955 |

UNITED STATES PATENT OFFICE
CERTIFICATION OF CORRECTION

February 21, 1961

Patent No. 2,972,226

Frederick L. Geary

It is hereby certified that error appears in the above numbered patent requiring correction and that the said Letters Patent should read as corrected below.

Column 8, line 45, strike out "the effective area of" and insert instead -- movement adjacent --.

Signed and sealed this 4th day of July 1961.

(SEAL)
Attest:

ERNEST W. SWIDER
Attesting Officer

DAVID L. LADD
Commissioner of Patents